Dec. 11, 1934.  C. L. KELLER  1,984,307
MOLDING APPARATUS
Filed July 28, 1930   2 Sheets-Sheet 1

INVENTOR.
Charles L. Keller
BY Allen & Allen
ATTORNEYS

Dec. 11, 1934. C. L. KELLER 1,984,307
MOLDING APPARATUS
Filed July 28, 1930 2 Sheets-Sheet 2
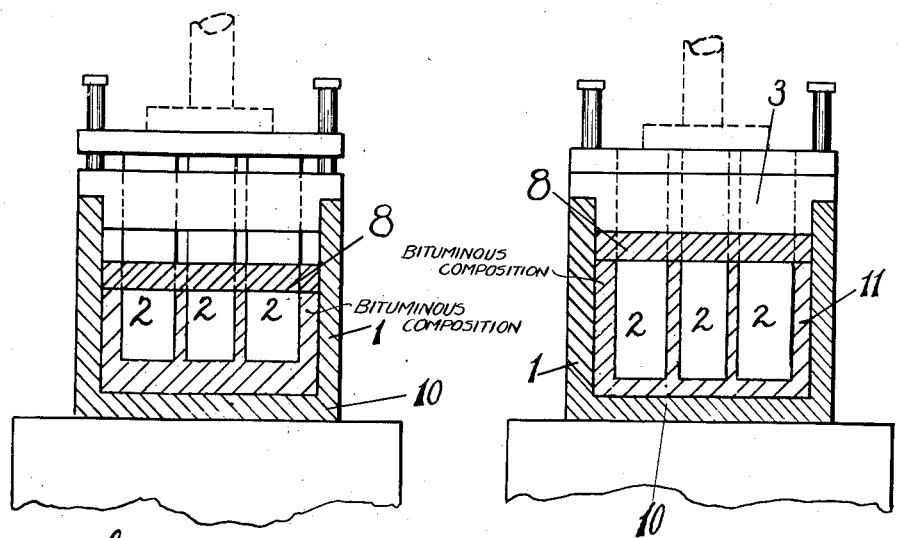
Fig. 5.   Fig. 6.
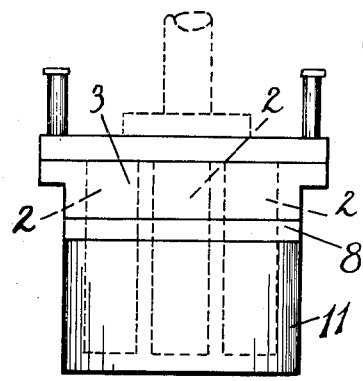
Fig. 7.
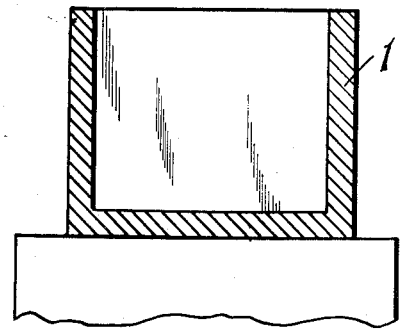
INVENTOR.
Charles L. Keller
BY Allen & Allen
ATTORNEYS Patented Dec. 11, 1934

1,984,307

UNITED STATES PATENT OFFICE 1,984,307

MOLDING APPARATUS

Charles L. Keller, Cincinnati, Ohio, assignor to The Richardson Company, Lockland, Ohio, a corporation of Ohio Application July 28, 1930, Serial No. 471,181

1 Claim. (Cl. 18—19)

My invention is of particular application to molding processes involving what is known as a "long draw", and while it is not restricted thereto, I shall describe it in connection with the manufacture of storage battery containers from a plastic bituminous composition.

The primary object of my invention is the provision of a new molding process and molding apparatus facilitating the carrying on of my process, to the end of producing more perfect battery boxes or other articles formed in a relatively long draw molding operation. The more specific objects of my invention will be pointed out hereinafter, or will be apparent to one skilled in the art upon reading these specifications, wherein I describe my invention in a preferred embodiment.

For the sake of clearness, I now refer to the drawings, in which

Figure 5 is also a sectional view of a mold equipped with the mechanism of my invention, in which a battery box is in an incomplete stage of formation.

Figure 6 is a sectional view through a mold showing a battery box in a complete state of formation.

Figure 7 is a semi-sectional view showing a battery box after molding, being stripped from the female part of the mold.

Figures 1, 2:
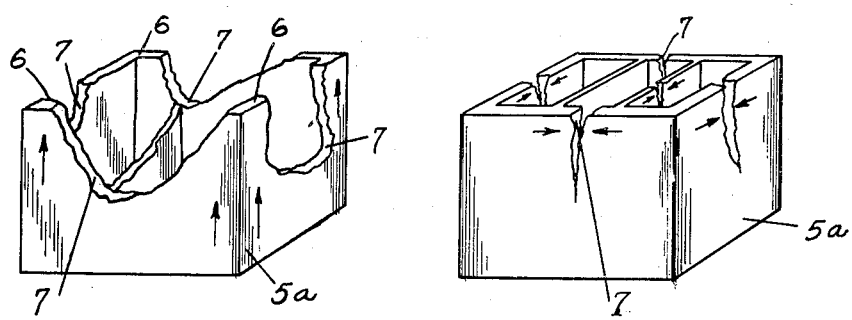
Figure 1 is a perspective view of a molded article in a state of partial formation.
Figure 2 is a view of the same article in a subsequent but still incomplete stage of formation.
Figure 3:
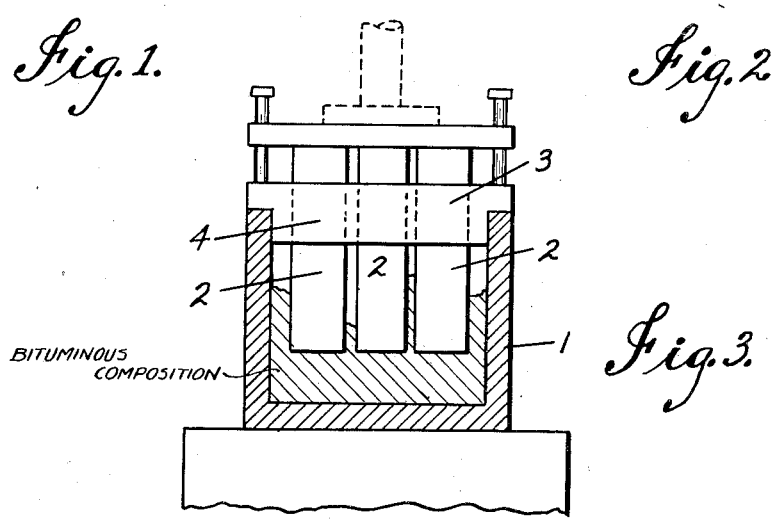
Figure 3 is a sectional view through a mold suitable for the formation of a battery box, certain parts of the mold construction being omitted for the sake of clearness.

In describing my invention as applied to the molding of battery boxes, I desire it to be understood that its application is not restricted thereto, the particular article being chosen as exemplary of articles in the formation of which my invention is of particular importance. Storage battery containers are today usually made of a relatively stiff plastic composition of bitumen, mineral filler and fiber. A hydraulic press is provided having a bed, and usually a pressure ram located above the bed. A mold block is provided on the bed, and the various plungers adapted to form the cell spaces are operatively attached to the ram. The common form of storage battery container comprises three separate cells in an integrally molded structure having a bottom, outer walls, and cell defining partitions, together with such other configurations as may be desired. A suitable handle construction is usually provided, and there are also, usually, projecting ribs formed in the bottoms of the cells so as to raise the storage battery plates above the actual cell floors.

I have illustrated in Figures 3 to 7 inclusive, a common type of mold comprising a female mold member 1 having a hollow interior in which the plastic material is introduced. In the type of mold illustrated, the male plunger member comprises plunger sections or cores 2 suitably affixed to a head, and operatively mounted upon the main pressure ram of the press. I have shown a stripper plate 3 through which the sections 2 operate. This stripper plate has a projecting portion 4 designed to enter the top of the female mold, and to mold the top edges of the outer and partition walls of the box. It is usual to provide in such molds a slidable bottom member or "kick out" operated by a separate ram on the press to remove the box from the female mold portion if it should stick therein. I have not shown this mechanism, since it forms no part of my invention; and I have simplified the showing of the mold mechanism for the sake of clearness. The function of the stripper plate 3 is not only, as aforesaid, to mold the top edges of the walls of the box, but also to center the plungers with reference to the mold block, and to remove a complete box from the plungers after the molding operation. Usually the box is drawn from the mold block upon the plungers, as shown in Figure 7, and is stripped from the plungers by the stripper plate 3. Means, not shown, are taken to stop the stripper plate at a certain point in its upward travel before the male plungers have reached their upper limit of motion, so as to effect the aforesaid stripping action.

The walls and partition members of the battery box are relatively thin, and yet they extend a considerable distance above the bottom of the box, say six or seven inches, in the usual sizes. This makes the formation of the box a long draw molding operation; that is to say, the relatively dense plastic is caused to flow or to be extruded between the adjacent mold portions over considerable distances. This not only requires relatively great pressure, but it is likely to produce in the finished box occasional imperfections, as I shall now describe.

In Figure 1, I have shown a battery box in an incomplete state of formation. It will be noted that the rise of the plastic in the mold has not been uniform, and that some portions of the box exhibit the full wall height, indicating that the plastic has flowed more freely in certain portions of the mold than in other portions. If any part of the molding composition is more plastic than other parts, it will, of course, flow more freely; and again, even under conditions of substantially equal plasticity, the composition will tend to flow more readily in the larger interstices of the mold than in the more restricted ones. In the molding operation, a lump or ball of the plastic composition is ordinarily placed in the female part of the mold. Upon the initial application of pressure it fills completely the floor of the mold, and then begins to rise between the several mold parts so as to form the walls referred to. The rise of the plastic is, as will be readily understood, for the most part an extrusion action in which the plastic slides along and between the mold parts. There may be some tumbling or intermixing action in the plastic as it is thus extruded, where there are presented to its flow transverse progressive recessions in the mold walls. However, the action seems primarily one of sliding or extrusion, and it tends to some extent to harden the composition at the surfaces, and to produce a relatively high finish on the walls. It also makes the composition less likely to adhere properly where masses thereof are pressed together from different directions. In Figure 1 the box indicated generally at 5 has portions 6 in which the tops of the walls have been fully formed, and portions 7 in which there has been a relatively very much less flow of the plastic. The flow of the plastic in the article of Figure 1 has, for the most part, been in the direction of the arrows, upwardly. In Figure 2 the box 5a has begun to have the portions 7 close up by a lateral flow of the plastic under pressure in the direction of the arrows. The unformed portions are relatively of less extent, but it will be observed that they will finally be closed by a union of plastic masses pressed together at meeting lines by the lateral flow of the plastic. These meeting lines are likely to form points of weakness in some instances, leading to the development of what is known as "hair cracks", weakening the walls of the box, particularly near the top thereof, and in exaggerated instances, permitting the leakage of the electrolyte from the cells.

With this explanation, it will be understood that it is an object of my invention to prevent the formation of cracks or flaws in a molded article due to the nature of the flow of a plastic in a long draw operation. It is another object of my invention to cause the plastic in a long draw molding operation to rise evenly in the mold, so that the molding action is confined, so far as the walls of the article go, substantially to a unidirectional flow, the walls being formed without any substantial lateral flow of the plastic, or at least without the conditions heretofore described, resulting in the production of portions of the molded article formed by the pressing together of adjacent masses of the composition in a direction different from the direction of the main application of pressure.

I accomplish the objects of my invention essentially through the provision of means in the mold controlling the flow of the plastic composition therein; and in the formation of storage battery cases, I do this by means of a ring or other structure, as I shall now describe.

Figure 4:
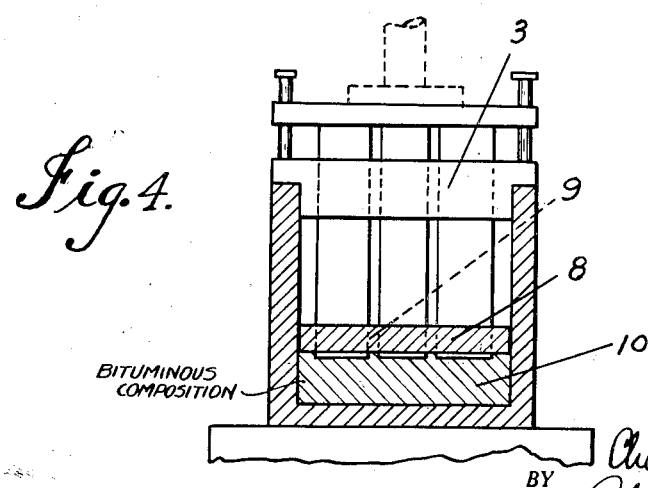
Figure 4 is an illustration of a battery box mold equipped with the mechanism of my invention in an exemplary embodiment.

In Figure 4 I have shown a control member 8. This is a metallic device having outside dimensions permitting it to slide with a relatively close fit, within the female part of the mold, and having cut out portions to accommodate the male plunger sections 2. The control member 8 may, in this case, be spoken of as a grid, since it has, like the stripper plate 3, portions 9 extending between the plungers. This ring or grid is preferably introduced into the mold with or upon the plungers, but is slidable relatively thereto. It sinks in the mold until it rests upon the mass of plastic composition. The initial tendency of the pressure is to flatten the composition out upon the floor of the mold, and to cause it to contact with the ring from beneath. This stage is illustrated in Figure 4, where the plastic composition is indicated at 10, as confined between the control member or grid 8 and the floor of the mold block 1.

As pressure is applied, the plastic material begins to extrude into the spaces between the walls of the mold block 1 and the plunger sections 2, and into the spaces between said sections 2, carrying the grid upwardly with it. By reason partly of the weight of this member or grid 8 and the resistance which it therefore presents to the flow of plastic, and partly also by reason of the fact that a tilting of the member or grid 8 within the mold produced, for example, by a greater rise of the plastic at one side than at another, would tend to cause the control member or grid 8 to bind in the mold until the rise of the plastic had been evened up. The plastic is compelled to rise in my mold evenly, with the top edges continuous at all times by thus requiring the overcoming of substantial frictional resistance thereby. The condition in Figure 5 is thus sharply contrasted with the irregular rise of the plastic composition 10a in Figure 3.

The box at the completion of the molding operation is shown in section in Figure 6, in which the control member 8 is seated against the stripper plate 3 when the molding operation is finished. Subsequently, upon the withdrawal of the plunger member from the mold, as shown in Figure 7, the now completed box 11 is usually withdrawn upon the plungers, the control member or grid 8 still being seated against the stripper plate 3. When the stripper plate is stopped in its upward motion and the plungers further withdrawn, the box 11 is free, as will be readily understood, and may be removed as a finished article.

It will be observed that my molding operation results in essentially a preformation of the tops of the outer and partition walls of my box under conditions which preclude the formation even of incipient hair cracks or imperfections therein. Afterward the flow of the plastic and its disposition at its advanced edge are controlled so that it extrudes evenly in the long draw, and the box is ultimately finished in perfect condition.

It will be clear that in the ordinary mold where my grid or forming ring is employed, the projecting portion 4 of the stripper plate may be diminished in thickness to accommodate the thickness of the member 8, or the female mold portion may be made taller for a similar purpose. It will be noticed in my improved process and apparatus that it is the forming member 8 which molds the tops of the walls in my box. The member 8 may also be used as the means for centering the male plungers in the female mold, and the projecting portion 4 of the stripper plate may be eliminated. I do not prefer to do this, however, because it is advantageous to center the plungers initially at a higher point in the mold than the initial position of the forming or control member 8, as shown, for example, in Figure 4. It will be quite obvious that modifications may be made in my mechanism without departing from the spirit of my invention, such modifications being within the purview of one skilled in the art to produce, particularly in adapting my molding mechanism and process to articles other than the battery boxes which I have described as exemplary.

Having thus set forth my invention, what I claim as new and desire to secure by Letters Patent, is:—

Apparatus for the high pressure molding of articles from plastic material by the extrusion of a portion of said material from a mass thereof, comprising a hollow-mold member having confining means at one end to confine said mass, and a plunger member movable toward said confining means within the mold member to press said mass against said confining means, said plunger member being narrower than the interior of said mold member to leave a space into which a portion of said mass is extruded toward the opposite end of the mold, and a control member movable in said space under propulsion of and presenting resistance to the advance of said extruding portion of said mass, to control the disposition of said extruding portion at the advancing edge thereof, said control member fitting said space loosely enough to tilt and bind against the other members of said apparatus under unequal conditions of propulsion, thereby augmenting its resistance to said advance until said conditions of propulsion are more nearly equalized.

CHARLES L. KELLER.